US011843661B2

(12) United States Patent
Moore

(10) Patent No.: US 11,843,661 B2
(45) Date of Patent: *Dec. 12, 2023

(54) WEB SERVICE SYSTEM AND METHOD

(71) Applicant: Comcast Interactive Media, LLC, Philadelphia, PA (US)

(72) Inventor: Jonathan T. Moore, Philadelphia, PA (US)

(73) Assignee: Comcast Interactive Media, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,464

(22) Filed: Mar. 16, 2022

(65) Prior Publication Data

US 2022/0394087 A1 Dec. 8, 2022

Related U.S. Application Data

(63) Continuation of application No. 12/470,567, filed on May 22, 2009, now Pat. No. 11,323,508.

(51) Int. Cl.
*H04L 67/1008* (2022.01)
*H04L 67/568* (2022.01)
*H04L 67/1001* (2022.01)

(52) U.S. Cl.
CPC ...... *H04L 67/1008* (2013.01); *H04L 67/1001* (2022.05); *H04L 67/568* (2022.05)

(58) Field of Classification Search
None
See application file for complete search history.

(56) References Cited

U.S. PATENT DOCUMENTS

| 7,908,358 | B1 | 3/2011 | Prasad et al. |
| 2005/0166180 | A1 | 7/2005 | Lemon et al. |
| 2005/0198200 | A1 | 9/2005 | Subramanian et al. |
| 2005/0198335 | A1 | 9/2005 | Brown et al. |
| 2006/0248522 | A1 | 11/2006 | Lakshminarayanan et al. |
| 2007/0083627 | A1 | 4/2007 | Mohammed et al. |

(Continued)

FOREIGN PATENT DOCUMENTS

WO 2009042834 A1 4/2009

OTHER PUBLICATIONS

Nabor C. Mendonca et al., Client-side selection of replicated web services: An empirical assessment, The Journal of Systems and Software 81 (2008) 1346-1363.

(Continued)

*Primary Examiner* — Kevin S Mai
(74) *Attorney, Agent, or Firm* — Banner & Witcoff, Ltd.

(57) ABSTRACT

A system for providing a web service on a network of addressable nodes, said web service comprising a plurality of discrete, individually-addressable microservices, said system comprising: (a) at least one load balancer configured for routing a request from a node for a microservice to one of a plurality of virtual addresses, each virtual address corresponding to a unique microservice, and (b) one or more physical nodes associated with each virtual address, each physical node comprising one or more microservices, each microservice comprising a microservice-specific module for executing a particular function, said microservice-specific module linked to an interface for communicating over said network, each microservice being one of a plurality of individually-addressable microservices constituting a web service.

23 Claims, 6 Drawing Sheets

(56) References Cited

U.S. PATENT DOCUMENTS

| | | |
|---|---|---|
| 2007/0157172 A1 | 7/2007 | Zenz et al. |
| 2007/0245352 A1 | 10/2007 | Ma |
| 2008/0263209 A1 | 10/2008 | Pisharody et al. |
| 2008/0275935 A1 | 11/2008 | Mohindra et al. |
| 2008/0313649 A1 | 12/2008 | Tian |

OTHER PUBLICATIONS

European Application No. 10 16 2736 Search Report dated Jan. 16, 2012.
Codeartisan, "REST: Unix programming for the Web", dated Mar. 16, 2008, retreieved from http://codeartisan.blogspot.com/2008/03/rest-unix-programming-for-web.html; on May 20, 2009.
Canadian Office Action—CA Appl. 2,704,461—dated Jun. 29, 2016.
Canadian Office Action—CA Appl. 2,704,461—dated May 23, 2017.
Jan. 10, 2018—Canadian Office Action—CA 2704461.
Mar. 5, 2019—Canadian Office Action—2,704,461.
Sep. 9, 2020, Canadian Office Action, CA 2,704,461.
Nov. 16, 2021—Canadian Office Action—CA 2,704,461.

WEB SERVICE SYSTEM AND METHOD

CROSS REFERENCE OF RELATED APPLICATIONS

This application is a continuation of U.S. patent application Ser. No. 12/470,567, filed May 22, 2009, which is hereby incorporated by reference in its entirety.

REFERENCE TO APPENDICES

Attached hereto are Appendices A and B1-B3 listing software code for a framework and three (3) microservice-specific modules, respectively, implementing various features described herein using the Python programming language.

FIELD OF THE DISCLOSURE

The present disclosure relates generally to web services, and to an approach for distributing functionality among discrete web services on addressable nodes of a network.

BACKGROUND

The exponential expansion of the Internet, and, in particular, the World Wide Web, has facilitated the growth and increased popularity of web services. A web service may be a software system designed to support interoperable machine-to-machine interaction over a network. Such web services are defined, for example, by the World Wide Web Consortium, and include, for example, a common website intended for human consumption, or a web application programming interfaces (APIs) that can be accessed over a network, such as the Internet, and executed on a remote system supporting the requested services.

A need exists to improve the efficiency in deploying web services on a network, such as the World Wide Web. Traditional approaches for upgrading web services include replacing existing applications, recompilation to reuse existing modules, clustering/load-balancing of monolithic software systems to provide scale, and integrated caching strategies and configurations. Applicant has identified, however, significant shortcomings in these approaches. For example, replacing an existing application of a software service to create a completely new web application is error prone and causes the cache associated with the old application to be lost. Recompilation for reuse traditionally requires that the existing functionality be implemented in a compile-time-compatible language and be easily extracted. However, such functionality is not often implemented in a compile-time-compatible language, nor is it easily extracted. For example, the specific functionality desired may be only a small part of a large software library, requiring the whole library to be included when only a part is desired. Monolithic software systems cannot be scaled at a granular level (e.g. subsystem level) without special-purpose code. Furthermore, caching must be pre-contemplated and built into existing software stacks. The result of these shortcomings is a relatively rigid, essentially "hard-wired" distribution of functionality, in which the load balancing and caching ability of the operating systems and existing infrastructure is not leveraged.

SUMMARY OF THE DISCLOSURE

The present disclosure involves, among other things, a recognition that distributed programming such as that used in web services may be designed to be portable, multi-tasking and multi-user in a time-sharing configuration. These characteristics may use various concepts including using plain text for storing data, instituting a hierarchical file system, treating devices and certain types of inter-process communication (IPC) as files, and using a large number of software programs that can be strung together using software links in a common framework interface, as opposed to using a single, monolithic program.

Specifically, with these philosophical underpinnings, the present disclosure introduces the concept of discrete "microservices" of a larger web service, each microservice located on an individually addressable node in the network. In other words, a web service may be broken down into individual microservices that are individually maintained, addressed, and deployed in the network. Each microservice typically (although not necessarily) executes a particular function. Two or more different microservices cooperate or function interactively to provide a single web service. For example, cooperating microservices may involve a first microservice generating a reply based on the reply of a second microservice. To this end, the first microservice may initiate a secondary request to the second microservice in the course of generating its reply. Therefore, the example embodiments herein may provide discrete portions of functionality in separately-deployable microservices. Examples of microservices include an interface to a single database table, a slice of application functionality (e.g. user favorites), search indices, and messaging systems, among others. The microservices may adhere to a common deployment model (e.g., one microservice for each system process) and runtime environment (e.g., REST/XML/HTTP web services) to enable simple integration with other web services and granular scalability. In some embodiments, monolithic programs can be reduced to separately addressable microservices to perform one or more discrete function(s). The microservice therefore embodies the philosophy of doing one thing, and doing it well.

Complex systems can be created by assembling small web services using a common communication protocol. More specifically, by segregating functions to discrete microservices that are supported by different nodes, complex systems can be formed by the nodes using a standard web service protocol, such as HTTP. Specifically, "composite" microservices can combine or coordinate the usage of other microservices by functioning as a client of those microservices. Generating a composite microservice that comprises disparate microservices into a complex system.

Building relatively complex systems using relatively simple microservices on discrete nodes, provides a number of advantages including (1) scalability, (2) efficiency, (3) uniformity, and (4) deployability, (1) Scalability Some embodiments may have each microservice resident in a separately addressable node, and such a system can be readily scaled up by just deploying additional instances of a particular microservice on existing or new nodes. For example, because the microservices are separately deployable, a programmer may add capacity for only the functions that are slow. In other words, if a particular microservice is "bottlenecked," just that microservice needs to be augmented. This avoids the need to add instances of a larger, monolithic program containing superfluous functions. Additionally, the separate deployability of the microservices facilitates the replacement, modification or upgrade of one or more "functions" without having to replace the entire application—just a particular microservice can be modified or added. This approach avoids replacing entire programs and may thus leave the cache intact. Moreover, because the nodes of the web service need not be homogeneous, but rather can be configured and/or populated with one or more different microservices depending on demand, the system has full flexibility as to number of microservice instances to deploy and where to deploy them.

(2) Efficiency

Features herein may also promote efficiency by exploiting the existing infrastructure of the physical node supporting each microservice. Conventionally, a program would have a variety of "threads" or subprocesses for which the programmer would need to allocate processing resources. Typically this resource allocation was performed at compile time, or the programmer would specifically have to program in the ability to modify the resource allocation at runtime. This was not only inconvenient, but also did not leverage the ability of the operating system to multiplex hardware resources. In contrast, some embodiments herein break down each subprocess or thread into a smaller number of microservices. In one embodiment, the microservice executes essentially only a single thread (although the present invention is not limited to this embodiment). By reducing the number of threads or subprocesses in a microservice, the function of the microservice becomes more "transparent" to the operating system of the node, thereby allowing the node to load balance between the various microservices residing on it. In other words, rather than resource allocation being static and pre-determined by a programmer prior to compilation of the program, some embodiments herein may allow the operating system of the node to dynamically allocate resources during run time of the microservice. This allows real-time environmental factors like which microservices are bottlenecks to be considered. Furthermore, because microservices require less memory because the nodes/network are bearing more of the load, more memory can be allocated to the filesystem cache as discussed below.

Microservices may be deployed and connected using a common transmission web protocol, thereby allowing well-established web service caching programs to be used. For example, HTTP has caching controls built into the protocol (See RFC 2616, Sec. 13), which can capture essentially any necessary caching semantics. Furthermore, commercially available or open source, "off-the-shelf" web caches can be used including, for example, Squid and Sun's Web Proxy Server. This exploits caches that have already been optimized. There are even protocols to support distributed caching (ICP, CARP, etc.). Furthermore, as mentioned above, because microservices can be deployed as needed and entire applications need not be replaced wholesale, the cache remains intact.

(3) Uniformity

Functions executed by a particular web service may vary greatly and may even be written in different languages. Embodiments herein may provide uniformity by connecting the various microservices with a common communication protocol. Specifically, the microservice comprises a common interface or framework that may be linked to a microservice-specific module. The microservice-specific module executes the specific function or process of the microservice. Although the microservice-specific module may be written in any language suitable for executing the function of a particular microservice, the framework provides a common communication protocol among all the microservices to facilitate the microservice's integration within the network.

Such an interface offers a number of benefits. For example, the interface may be essentially the same for all microservice-specific modules of a particular language. Specifically, the framework comprises general "boilerplate" that renders it compliant with the communication protocol used, and provides it with access to the various libraries available in these protocols (e.g. HTTP and XML libraries). As used herein, a library can be viewed as a collection of subroutines that provide services to independent programs. This allows code and data to be shared and changed in a modular fashion. Most modern operating systems provide libraries that implement the majority of system services. Thus, the interface module can connect programs or libraries written in a communication protocol such as HTTP with scripting languages such as Tcl, Perl, C/C+, Python, Ruby, PHP, Lua, R, Java, C#, Scheme and Ocaml. Therefore, as with the load balancing and cache mentioned above, the present invention exploits the operating system of the nodes to reduce the resources requirements at the application level.

(4) Deployability

The use of a common interface in each microservice allows the interface to exercise common installation/deployment procedures to ensure all prerequisite microservices are available. Specifically, because the web services may be distributed over discrete microservices, and because microservices can be deployed individually as needed, there is a need to ascertain whether prerequisite microservices are available for a given microservice when it is deployed on the network. To this end, the common interface microservices have may be configured to quickly identify itself in response to a request from a microservice being installed. For example, in an HTTP environment, the deployment procedure may be to send out a HEAD request to all necessary, prerequisite microservices. This is easily performed since each microservice may be discretely addressable. A microservice knows that a prerequisite microservice is available when a reply to its HEAD request is returned by the various instances of the prerequisite microservices.

Such a deployment scheme offers a number of benefits. First, it may minimize reliance on a table of installed/uninstalled programs to serve as the index to the prerequisite services—which may be out-dated or otherwise incomplete, and which does not incorporate realtime availability (e.g. a prerequisite microservice may be deployed but malfunctioning). Rather, the deployment scheme herein may receive confirmation that the prerequisite microservice actually exists and is operational. The ease of installation/deployment afforded by using simple presence confirmation, such as a HEAD request, extends beyond installation/deployment to the actual development of the microservice. Specifically, developers may run a physical node on their workstation to test new microservices. This allows the developer to run just the microservices he or she is working on, and any that depend on it, at their local work station.

In general, features herein may offer significant cost savings by simplifying operational functions associated with upgrades and installations, and by tolerating non-homogeneous nodes such that computers having different microservices and operating systems can be used together.

Accordingly, one aspect described herein is a web service system that uses microservices located in discretely addressable nodes to perform specific functions for the web service. For example, a web service may be a movie database website that has distinct microservices for supporting different aspects of the site. One microservice may handle the display of advertising and managing click-throughs (e.g., determining what ad content to display for the user), another microservice may handle the ability to search through movie listings using user-entered keywords, while another microservice may process orders to purchase a movie. These microservices may be instanced on different physical nodes in the system. In one embodiment, a web service system comprises: (a) at least one load balancer for routing a request from one node for a microservice to one or more virtual addresses; (b) each virtual address corresponding to a unique microservice, and (c) one or more physical nodes associated with each virtual address, each physical node comprising one or more microservices, each microservice comprising a microservice-specific module for executing a particular function.

Another aspect is a physical node of the web service system described above. In one embodiment, the physical node comprises: (a) a load balancer for distributing a request from the network to one of one or more different ports within the physical node; and (b) a microservice associated with each port for generating a reply to the request and outputting the reply to the network.

Another aspect involves a method of using the system described above. In one embodiment, the method comprises: (a) receiving a request from a first node to execute a microservice having a particular function; (b) routing the request to a particular address of a physical node supporting the microservice; (c) performing the function using the microservice in response to the request and generating a reply; and (d) returning the reply to the first node if the reply does not comprise a request for another microservice.

Yet another aspect is a node configured with the microservice. In one embodiment, the node comprises a processor, I/O circuitry, memory, and at least one addressable microservice stored in the memory for instructing the processor to perform a function, each microservice comprising at least (a) a framework having one or more utilities for communicating with the nodes in a common protocol within the web service network, and at least one link to a microservice-specific module for requesting the microservice-specific module to execute the function and for receiving a reply in response to a request; and (b) the microservice-specific module comprising at least one routine for executing the function and providing the reply in response to the request over the link. Another aspect is a computer-readable medium comprising at least one addressable microservice for instructing a processor to execute a function in response to a request and provide a reply to a web service network, the microservice comprising at least a framework having one or more utilities for communicating in a common protocol with addressable nodes within the web service network, and at least one link to a microservice-specific module for requesting the microservice-specific module to execute a particular function and for receiving a reply in response to a request. In one embodiment, the medium also comprises a microservice further comprising the microservice-specific module comprising at least one routine for executing the function and providing the reply over the link in response to the request.

Yet another aspect is a process for executing a function in response to a request for a microservice on a web service network of addressable nodes. In one embodiment, the process comprises: (a) receiving the request at a physical node from a first addressable node, the physical node supporting the microservice, the microservice comprising at least a framework having one or more utilities for communicating in a common protocol with the addressable nodes within a web service network and a microservice-specific module linked to the framework, the microservice-specific module having at least one routine for executing the function in response to a request; and (b) requesting the microservice-specific module to execute the function; (c) executing the routine to generate a reply and providing the reply to the framework in response to the request; and (d) responding to the first addressable node by the framework transmitting the reply in the common communication protocol to the first addressable node.

Another aspect is a method of deploying the microservices in the network described above. In one embodiment, the method comprises: (a) loading a microservice in a physical node, the microservice comprising at least a framework having one or more utilities for communicating in a common protocol with the addressable nodes within a web service network and a microservice-specific module linked to the framework, the microservice-specific module having at least one routine for executing the function in response to a request from the framework, the microservice-specific module requiring at least one prerequisite microservice to execute the function; (b) generating a list of prerequisite microservices from the microservice, the list including the prerequisite microservice, wherein the prerequisite microservice has a particular prefix and port number; (c) transmitting a request to the port number to determine if the prerequisite microservice is operating; (d) starting the microservice if a reply is received from the prerequisite microservice.

DETAILED DESCRIPTION

Figure 1:
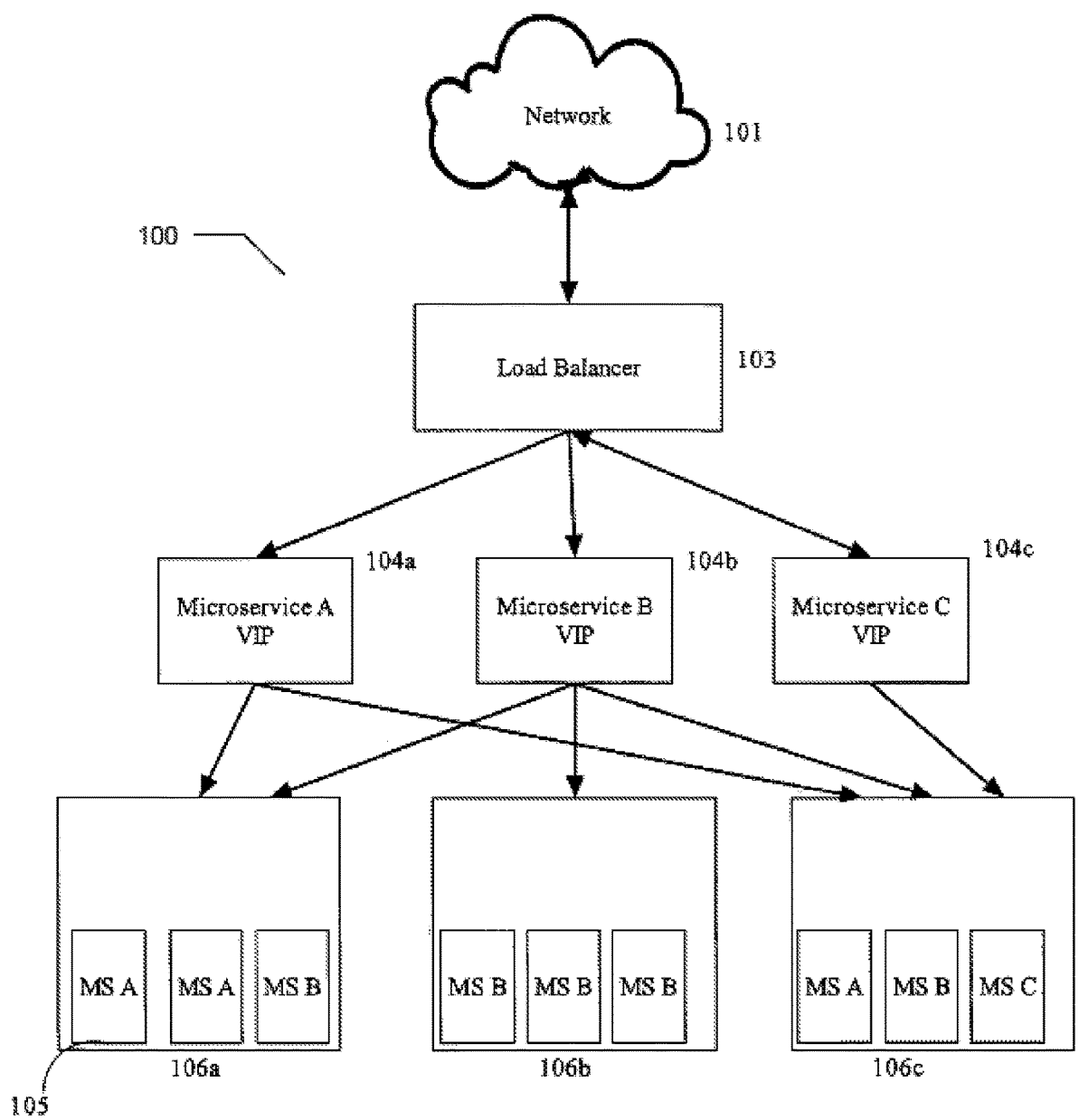
FIG. 1 is a schematic diagram of one embodiment of a web service system using microservices.

Referring to FIG. 1, a web service system 100 on a network 101 of addressable nodes is shown. A web service may be a single Internet site, or other user interface offered over a network, and the web service may be implemented using multiple microservices that may be responsible for handling individual aspects of the overall web service. For example, a commercial Internet site may include banner display ads, search text boxes, and menu options, and while the overall site may be a single web service, the individual ads, boxes and menu options may be generated by disparate microservices from different addressable nodes. An addressable node may be an active electronic device that is attached to a network, and is capable of sending, receiving, or forwarding information over a communications channel.

The system may include load balancer 103 for routing a request from one addressable node to one or more virtual addresses 104a-104c. The load balancer 103 may be an addressable node as well, or it may simply be software executing on an addressable node. The virtual addresses 104 may be associated with the load balancer 103, and each virtual address may correspond to a unique microservice. A microservice may be any type of software service offered by a node on the network 101. In this schematic, virtual addresses 104a, 104b, and 104c are associated with microservices (MS) A, B, and C, respectively. The system 100 also comprises one or more physical nodes 106a, 106b, and 106c. The physical nodes 106a-c may be implemented using any desired computing device, such as a network server or personal computer. Each physical node supports one or more microservices 105, by executing software to provide the service offered by the microservices 105. In this example, physical node 106a supports microservices A and B, physical node 106b supports microservice B, and physical node 106c supports microservices A, B and C. Each microservice is associated with each virtual address 104. Accordingly, in this example, virtual address 104a is associated with physical nodes 106a and 106c, virtual address 104b is associated with physical nodes 106a, 106b, and 106c, and virtual address 104c is associated with only physical node 106c. Requests for the service of a particular microservice may be addressed to a virtual address associated with the microservice.

Figure 3:
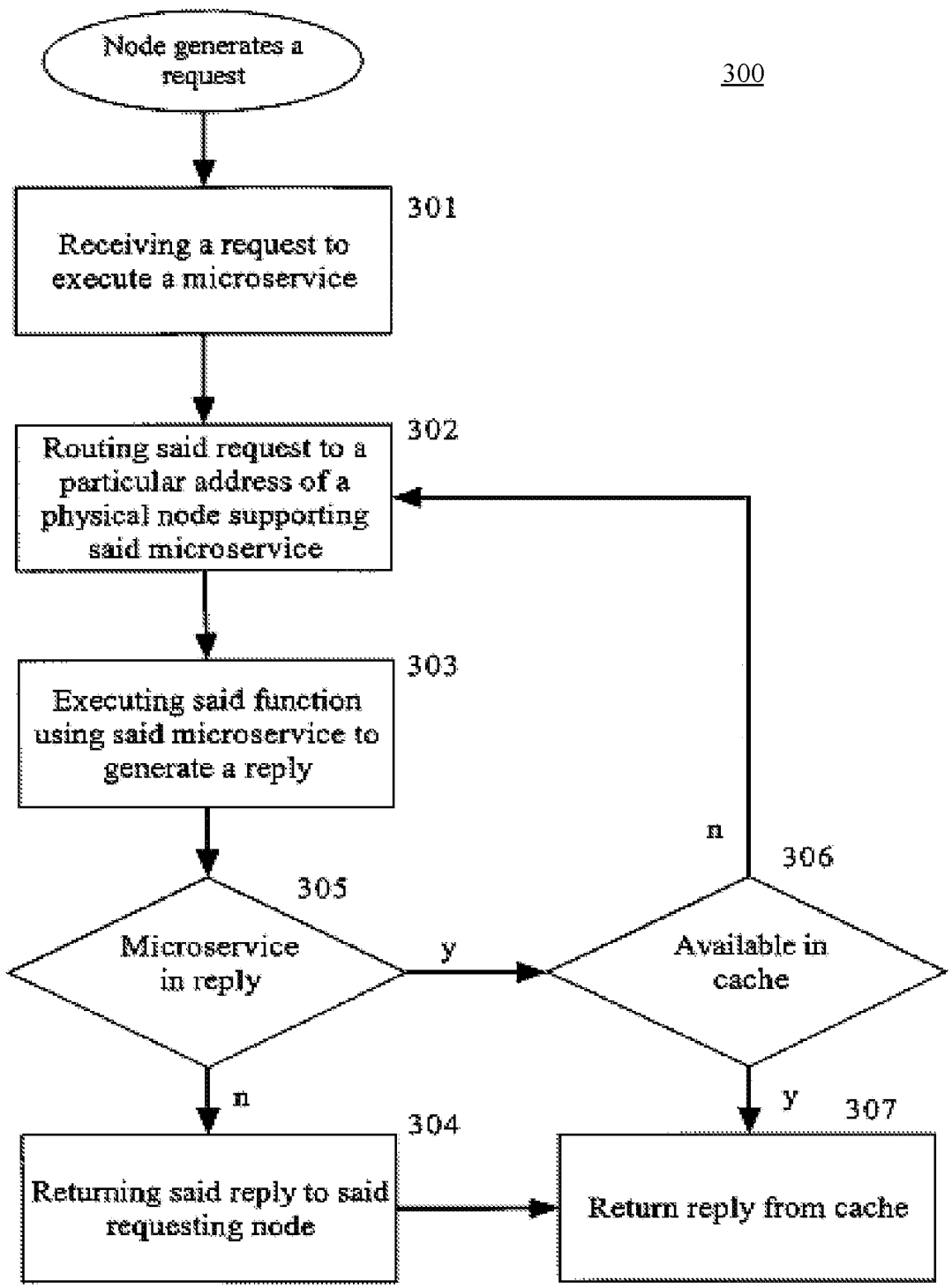
FIG. 3 depicts a method of processing a request using the web service system of FIG. 1.

This system may execute functions at the microservice level. Specifically, referring to FIG. 3, a flow chart 300 depicts one embodiment of the function of the operation of system 100. In the first step 301, the load balancer 103 receives a request from a first addressable node to execute a microservice. Next, in step 302 the load balancer transmits the request to a particular address of a physical node supporting the microservice (the address may be a virtual IP addressed associated with the microservice, or the actual physical address of a node that is already supporting the microservice). In step 303, the physical node supporting the microservice executes a microservice function in response to the request, and returns a reply. A reply may comprise, for example, an XML document containing data, plus the HTTP headers that would be sent along with it. In step 304, the reply is returned to the first node if the reply does not include a request for another microservice. For example, some microservices may rely on other microservices to operate, and the reply from one microservice may refer to another microservice. In one embodiment, if the reply includes a request for another microservice, as determined in step 305, steps 302-303 are reiterated by routing the new request to the address of the other microservice, before the end result is returned to the requesting node 304. In yet another embodiment, in step 306, the system determines if the reply is available in cache, and, if so, the reply is returned from cache in step 307. If the reply is not available in cache, steps 302-303 are reiterated as mentioned above. In one embodiment, this caching process is performed according to known caching protocols, such as those provided in Hypertext Transfer Protocol-HTTP/1.1.

Each of these elements and its operation is discussed below in greater detail.

The network 101 may be any network having addressable nodes. In one embodiment, the network is the Internet, and the physical nodes are part of the World Wide Web (Web), which is a large set of interlinked documents, images and other resources, linked by hyperlinks and URLs. These hyperlinks and URLs allow the web servers and other machines that store originals, and cached copies of these resources, to deliver them as required using Hypertext Transfer Protocol (HTTP). Alternatively, network 101 may be an intranet, such as a local network (e.g., a local-access network (LAN), wireless network, etc.), or a combination of Internet and intranet.

As mentioned above, HTTP is a client/server communications protocol on the Internet, and may be used to implement the communications herein It should also be understood, however, that the present invention is not limited to HTTP, and any protocol that provides a reliable request/response procedure can be used.

As mentioned above, the system comprises a plurality of addressable nodes, which may be an active electronic device that is attached to a network, and is capable of sending, receiving, or forwarding information over a communications channel. A node may be, for example, a data circuit-terminating equipment, such as a modem, hub, bridge or switch, or a data terminal equipment, such as a digital telephone handset, a printer or a host computer, for example a router, a workstation or a server. In LANs or WANs, nodes above a data link layer device (i.e., Layer 2 of the seven-layer OSI model) typically have a MAC address.

The load balancer 103 may be any computer configured for routing and forwarding requests to a specified address. The load balancer spreads work among two or more computers, network links, CPUs, hard drives, or other resources to optimize resource utilization, throughput, and/or response time. The balancing function is usually provided by a dedicated program or hardware device (such as a multilayer switch). An example of a suitable dedicated, hardware-based load balancer is a Citrix NetScaler. Rather than being embodied in dedicated hardware, the load balancer may be based in software running on a server. Examples of software embodiments include the Apache web server's mod_proxy_balancer extension and the Pound reverse proxy and load balancer, which are both open source products. In some embodiments, multiple components may be used in load balancing, instead of a single component, to increase reliability through redundancy.

In one embodiment, the load balancer 103 provides a single Internet service from multiple resources or physical nodes supporting a particular web service. The balancer itself may receive requests from other nodes, such as nodes running a web service, and may distribute those requests among suitable supporting nodes running the microservice, or the load balancer may be a node that also runs its own web service, which may issue requests for microservice assistance. For example, the load balancer may forward requests from a requesting node to one of a plurality of "backend" servers (e.g., the one or more physical nodes that support a given microservice). This allows the load balancer to reply to the requesting node without the requesting node knowing the internal separation of functions. It also prevents requesting nodes from contacting backend servers directly, which may have security benefits by hiding the structure of the internal network and preventing attacks on the physical node's network stack or unrelated services running on other ports.

When the load balancer 103 contacts a backend server, it may use a virtual IP address assigned to a particular microservice, so that applications using that particular microservice may direct their requests to that address—i.e., the microservice—without specifying the particular backend server to use. Specifically, the load balancer typically (although not necessarily) receives requests that are addressed to that virtual IP address, and redirects traffic using a hash or algorithm to the backend servers. A variety of scheduling algorithms may be used by load balancers to determine how traffic should be routed. Simple algorithms include random choice or round robin. More sophisticated load balancers may take into account additional factors, such as a server's reported load, recent response times, up/down status (determined by a monitoring poll of some kind), number of active connections, geographic location, capabilities, or how much traffic it has recently been assigned. High-performance systems may use multiple layers of load balancing.

In case of a physical node failure, the load balancer may automatically compensate so that traffic no longer goes to the failed/failing server. In one embodiment, the load balancer may provide a special procedure in the event that all physical nodes, which it services, are unavailable. This special procedure may include, for example, forwarding to a backup load balancer or displaying a message regarding the outage.

In one embodiment, repeated requests from a client may be directed to the same physical node. Since the client is not generally aware of which physical node it spoke to earlier, content switches define a notion of "stickiness." For example, requests from the same source IP address may be directed to the same physical node each time. Stickiness may also be based on Secure Sockets Layer (SSL) identification, and some content switches may use cookies to provide this functionality.

In one embodiment, the load balancer is a Level 7 load balancer, or content switch, in the OSI model.

Figure 2:
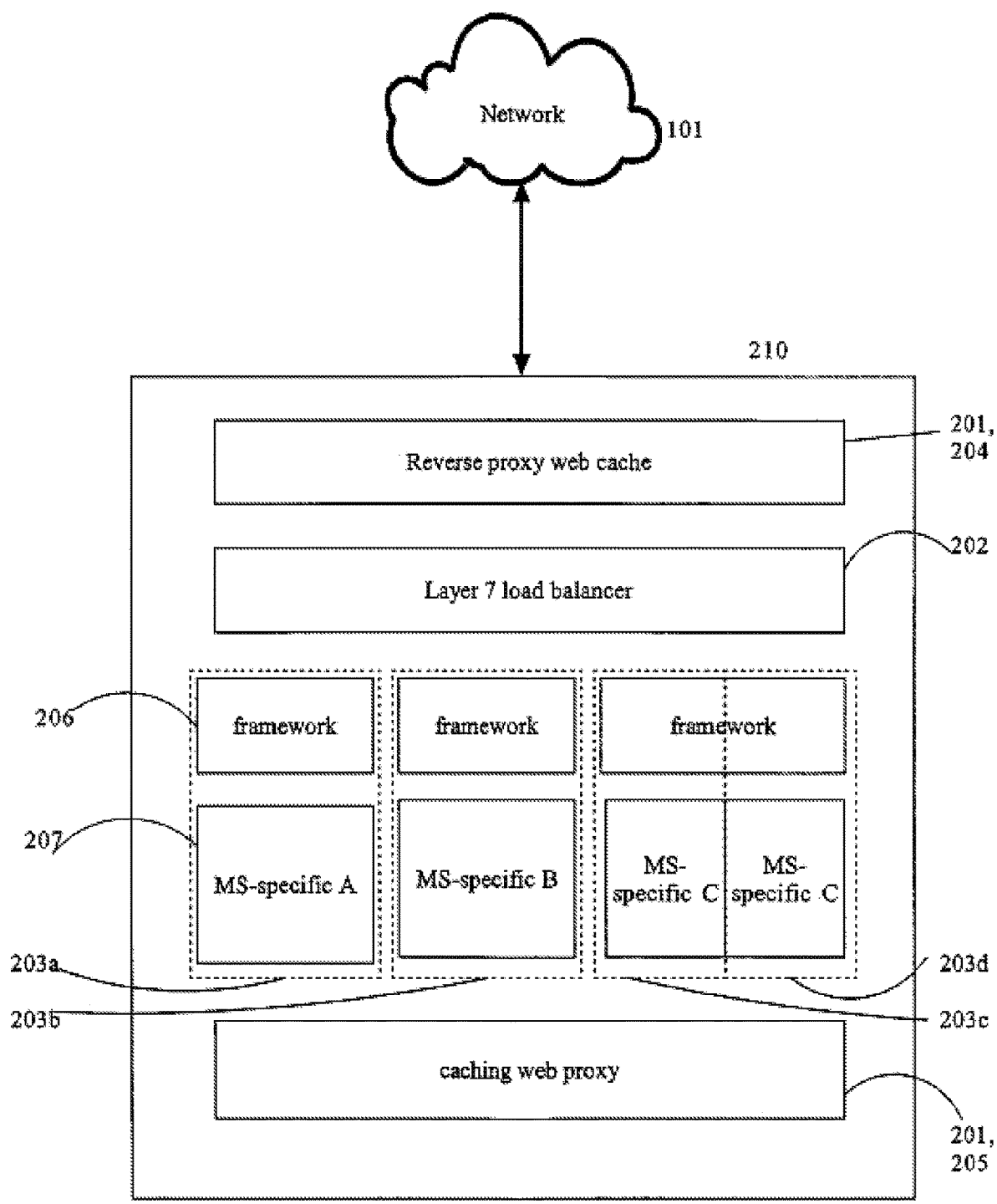
FIG. 2 is a schematic diagram of a physical node of FIG. 1.

Referring to FIG. 2, a schematic of the software functional components of a physical node 210 is shown. The physical node 210 may include a cache 201 to facilitate receiving requests from and returning replies to the network 101, and a load balancer 202 for distributing a request from the cache 201 to one or more microservices 203*a*-203*d* resident in node. As mentioned above, each microservice may have a unique virtual IP address, and the load balancer 202 can forward the request to this virtual IP address. The second load balancer is configured to know which microservices are active on its local ports. In one embodiment, it forwards a request for a microservice to any port on which a copy of that microservice is active (e.g., using host:port addressing to identify the host and port on the host). If desired, a deployment program establishing the microservice may cause the microservice code to be copied onto multiple physical nodes and executed at those nodes, and then may inform the load balancer so that the load balancer may begin routing requests to those additional instances of the microservice.

Each instance of a microservice resides on a single node, but multiple instances may reside on multiple nodes. For example, referring back to FIG. 1, microservice B is resident in each physical node 106*a*, 106*b*, and 106*c*. Likewise, multiple instances of the same microservice may reside on a single node. For example, physical nodes 106*a* and 106*b* in FIG. 1 support two instances of microservice A, and three instances of microservice B, respectively. Furthermore, instances of different microservices may reside on a single node. For example, physical node 106*a* supports microservices A and B and physical node 106*c* supports microservices A, B, and C. The physical node 210 depicted in FIG. 2, supports microservices 203*a*, 203*b*, 203*c* and 203*d*—microservice 203*a* executes function A, microservice 203*b* executes function B, and microservice 203*c* and 203*d* each perform function C. The microservice is configured to receive the request, process it according to a particular function, and output a reply to the cache 201. The cache 201 then transmits the reply to the original requesting node via the network 101. These elements are described in greater detail below.

In one embodiment, the same cache 201 can be used to receive requests from the network and transmit replies generated by the microservices 203*a*-203*d*, and, in another embodiment, a first cache 204 is used for receiving requests and a second cache 205 is used for receiving replies. The cache may be a web cache.

Figure 4:
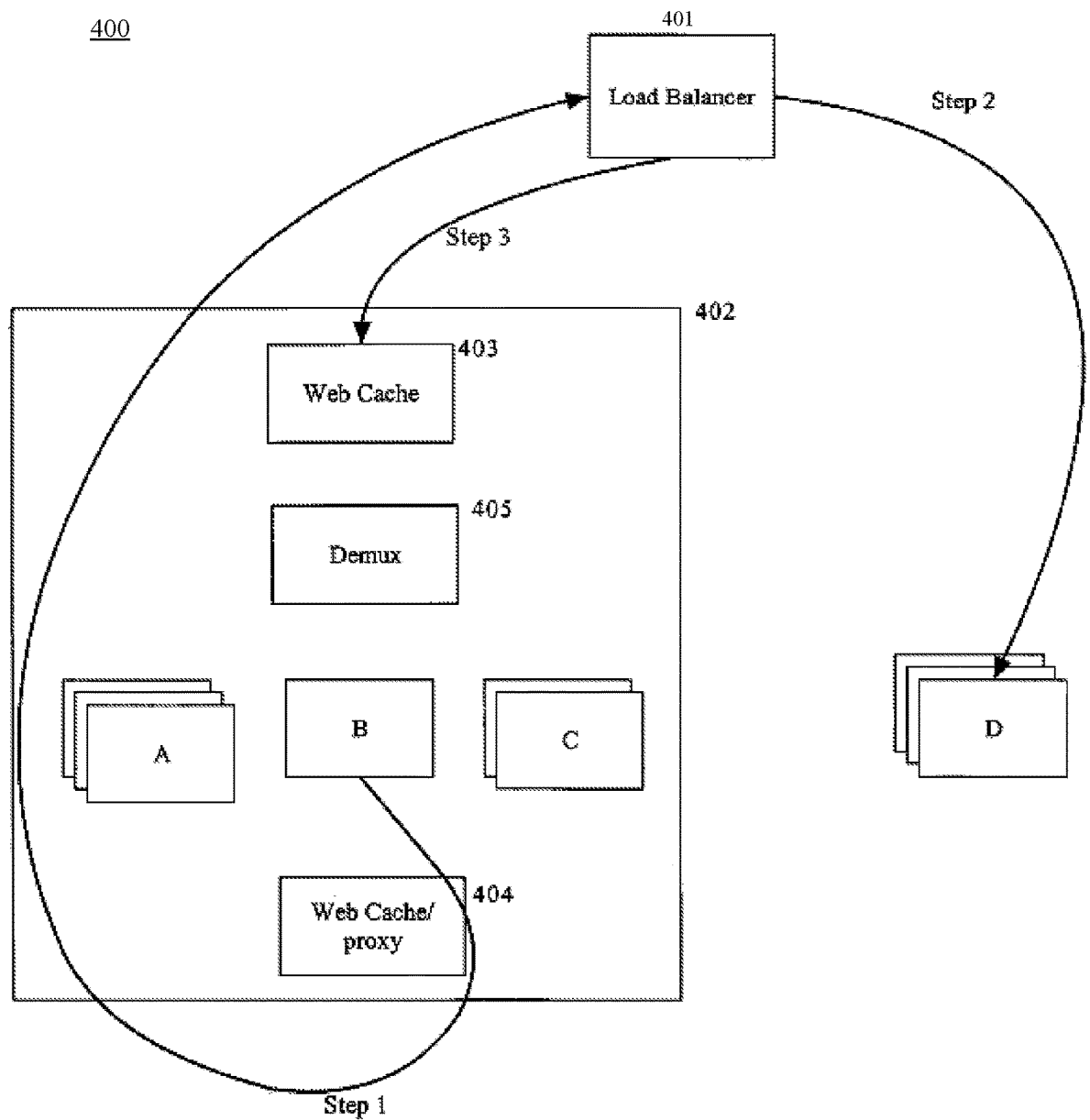
FIG. 4 depicts a method of web caching in the web service system of FIG. 1.

The web cache may be easily scalable. First, the physical nodes need not be homogeneous, thus allowing full flexibility as to number/size of cache instances per microservice. Caching may also be applied automatically where possible. For example, microservice may set caching headers. Furthermore, more memory may be allocated to file system cache because microservices need less memory themselves. Finally, because there is plenty of processing resources for IPC/XML parsing, cache use is not limited. To the contrary, a typical application is constrained by input/output (I/O)—caching reduces dependency on I/O. As mentioned above, caches improve efficiency. For example, referring to FIG. 4, a system 400 is depicted having a load balancer 401 and a physical node 402. Within the physical node 402 are multiple instances of microservices A, B, and C. The physical node also comprises a first cache 403 which is a web cache, and a second cache 404, which is a web cache/proxy. A demultiplexer 405 is also contained in the physical node 402. If microservice B needed an additional microservice D, the application could use the cache as a proxy (step 1) to get the D function (step 2) and return it through the load balancer (step 3). The D function would then be stored in the cache and tagged with specific requirements. In other words, when a request comes in for microservice B, which, in the process of computing its reply, needs to make a request of microservice D. The request to microservice D may be satisfied either by the local cache 404 on the node supporting microservice B (see, also forward cache 205 shown in FIG. 2), or by the reverse proxy cache on microservice D's node (see, e.g., the reverse proxy cach 204 shown in FIG. 2). Once microservice B receives the reply from microservice D, it computes its response and replies to the originating request.

The load balancer 202 may perform the function described above with respect to load balancer 103, that is, it may route requests to the appropriate microservice. Accordingly, load balancer may be embodied as described above with respect to the load balancer 103, and, in one embodiment, load balancer 202 is a layer 7 load balancer as described above. In an embodiment in which multiple instances of a particular microservice operate on a single physical node, a particular request may be routed to a particular microservice on the node based an algorithm or on a relatively simple protocol. For example, a simple protocol may be to send a request to a first microservice unless it is busy in which case the request is sent to the next sequential microservice on the physical node until an available microservice is detected.

In one embodiment, the load balancer may be incorporated into the web cache. Alternatively, the load balancer may be an independent software program, such as the Apache web server using the mod_rewrite and mod_proxy extensions. In another embodiment, the load balancer can be a dedicated hardware appliance, such as the BIG-IP from F5 Networks. In another embodiment, the load balancer is just a relatively simple demultiplexer for demultiplexing a multiplexed signal containing requests for multiple microservices. In some embodiments, each of the different nodes 106*a*-*c* may include additional load balancers, distributing requests among the instanced microservices running on that particular node. Regardless of its particular embodiment, the load balancer 103 functions to transmits/route a request to the appropriate microservice.

In one embodiment as shown in FIG. 2, each microservice comprises a "generic" framework 206 or interface and a microservice-specific module 207 linked to the framework, allowing the various microservices (which may be different microservices performing different functions) to be deployed in the same manner. The framework 206 may be partially-written software code that developers can use to create customized microservice modules. The partially-written software code may contain links or hooks, which may be data values or function identifiers that can be referenced by the microservice-specific modules to pass data and functions to and from a central managing program for the web service being supported. Using these links or hooks, the central managing program for a web service may rely on the same framework format for communicating with a variety of microservices, supporting greater interoperability. The framework interfaces with the network using a common protocol and with the microservice-specific module according to its language. Referring to Appendix A, an exemplary framework is provided. This framework interfaces with a network using HTTP on one side and with a microservice-specific module in Python on another side. Appendices B1-B3 provide examples of microservice-specific modules written in Python. It should be understood that these examples, discussed in detailed below, are for illustrative purposes only and should not be used to limit the scope of the invention.

The framework may be common to all microservice-specific modules of a common language. Therefore, given the limited number of scripting languages typically suitable for microservice-specific modules (e.g., Tcl, Perl, C/C+, Python, Ruby, PHP, Lua, R, Java, C#, Scheme and Ocaml), relatively few versions of the framework are necessary. To this end, the framework comprises general "boilerplate" that renders it compliant with the transport protocol used, and provides it with access to the various libraries available in these protocols (e.g. HTTP and XML libraries). Accordingly, the framework comprises one or more utility functions for compliance with the communication. For example, referring to lines 86-391 of the framework of Appendix A, various utility functions for HTTP compliance are provided. One particular exemplary utility is recited on lines 88-91:

```
def _format_http_date(self, timestamp):
    fmt = http_date_formats[0]
    fmt = fmt.replace('%Z','GMT')
    return time.strftime(fmt, time.gmtime(timestamp))
```

This utility routine formats the date into the format required by the HTTP specification. Still other standard routines may be incorporated into the framework to interface with the network. These other routines may include for example, routines for parsing byte-range parameters of HTTP requests, or implementing conditional request logic as directed by the HTTP specification.

The framework may be linked to the microservice-specific module, which executes the function. To this end, the framework comprises one or more links or hooks for interacting with the microservice-specific module. Requests are transmitted to the microservice-specific module and replies are received via these hooks. For example, the hooks may be "GET" functions in the parlance of HTTP. At least for a number of these hooks a default exists, such that if no reply is received, then the default value is returned to the network. For example, referring back to Appendix A, lines 23-64 of the code the hooks are provided for interacting with the microservice-specific module. Considering lines 40-43 in particular, the following hook is set forth:

```
def get_expiration_timestamp(self):
    max_age = self.get_max_age( )
    if max_age == None: return None
    return time.time( ) + max_age
```

This hook calculates the time at which the current state of a resource will expire. The default implementation uses the "max age" (maximum caching time) if available, and adds it to the current time to calculate the expiration time. A microservice-specific module may override this routine if a different expiration time calculation is desired.

It should be understood that not all hooks necessarily have a default. Specifically, some hooks require a reply from the microservice-specific module, otherwise the microservice indicates an error. For example, referring to the framework on Appendix A, lines 37-38 set forth the following hook:

```
def get_max_age(self):
    raise IllegalStateException("subclass must override get_max_age( )")
```

This hook is actually used by the default implementation of the previous example to determine the maximum cache time of this resource. The default implementation here raises an error, which a microservice-specific module must override to provide an implementation that does not raise an error so that the framework can make use of this information.

The framework may also comprise method handling routines. A method handling routine functions to implement a specific HTTP method. For example, on lines 393-515 of the framework of Appendix A, a HEAD function is outlined:

```
def do_HEAD(self):
    try:
        self.init_handler( )
        if not self.check_supported_path( ): return
        if not self._check_client_accepts_text_xml( ): return
        if not self._check_client_accepts_utf8( ): return
        if not self._check_client_accepts_identity_coding( ): return
        if not self._check_no_expect_header( ): return
        if not self._check_host_header_present( ): return
        if not self._check_if_match( ): return
        if not self._check_if_none_match( ): return
        if not self._check_if_modified_since( ): return
        if not self._check_if_unmodified_since( ): return
        self._parse_byte_ranges( )
        if not self._check_for_unsatisfiable_range( ): return
        if not self._check_if_range( ): return
        if not self.check_service_available( ): return
        self.send_response(self._get_successful_response_code( ))
        self._write_headers( )
    except:
        self._internal_error(sys.exc_info( )[0])
```

Based on this routine, a microservice implemented using this framework will be compliant with the HTTP specification for HEAD requests. Still other standard routines may be incorporated into the framework to interface with the network. These other routines may include for example, standards-compliant implementation of other HTTP methods, such as GET, POST, or DELETE.

As mentioned above, the microservice-specific module interfaces with the framework to perform a function in response to a request from the framework, generate a reply, and transmit the reply back to the framework. The function performed can vary based on the application. Applications may include, for example, database queries, read/write data services, search indices, just to name a few. Specific examples of microservice-specific modules are provided in Appendices B1-B3.

The microservice-specific module of Appendix B-1 is entitled dbTableUSvc.py. The module builds on top of the general microservice framework to encapsulate common requirements for accessing rows of a single database table. Specifically, it contains a notion of issuing a query against a table, retrieving one or more rows, and formatting them as XML. When combined with the general framework, it provides a new framework that allows the developer to easily develop new microservices to access specific database tables.

Microservice-specific module in Appendix B-2 is dbMoviesUSvc.py. This is an example of the specific microservice that accesses the "movies" table in a database. The primary logic involved here is in specifying a description of the kind of data found in each row of the table, and a decision on which URL patterns issue which queries. The actual execution of the query and formatting of the results happens in the dbTableUSvc, and the HTTP interactions are handled by the general microservice framework.

Microservice-specific module in Appendix B-3, is dbImagesUSvc.py. This is another specific microservice providing access to the "images" table. Note that it also builds upon the same dbTableUSvc (and thus the general microservice framework) and simply specifies different data and a different mapping of URLs to queries.

Within a node, a framework may be dedicated to a particular microservice-specific module or it may be shared among different instances of a particular microservice-specific module or even different microservice-specific modules. For example, referring to FIG. 2, microservices 203a and 203b, each use a dedicated framework, while microservices 203c and 203d use a single instance of a framework. The choice of how to configure the framework and microservice-specific modules on a physical node may depend on various factors including, example, whether the framework and microservice-specific module are compiled or interpretive. This typically depends on the language of the microservice-specific module. Generally, if the underlying language works with an interpreter, dedicated instances of a framework will be loaded into memory. On the other hand, if the underlying language in a compilation type language, then a single copy of the framework may be loaded and referenced as a shared library.

As mentioned above, the microservice may be an addressable function. Its address may comprise one or more URLs with a common prefix. For example, the following prefix can be used in HTTP based networks:

—http://host:port/uSvc1-1.0.0/ . . .

This prefix indicates that a particular microservice is being addressed (namely, version "1.0.0" of microservice "uSvc1"). Following this prefix are the paths or other locators for specific resources on the network which relate to or support the function of the microservice. For example, if the microservice pertains to providing user favorites, the specific resources may pertain to a particular user profile or queries for developing user favorites. The microservice may be reduced down to an "atomic" RESTful (Representational State Transfer) web service, in which the resources for which the system process is performed (e.g., URL patterns) cannot be implemented separately and still make sense. By minimizing the functionality of a given microservice, short (shallow) URLs lists following the microservice prefix may be used in such embodiments.

The granular microservice concept and built-in functionality of network languages, such as HTTP, enables the microservice to be readily deployed. More specifically, whether the prerequisites or dependences for a given microservice are available on a given network can be readily ascertained by "pinging" them on the network with a simple request. For example, it may be a reply indicating that the request was received. For example, a normal HTTP GET request returns a response body (i.e. some data) and some metadata about the response (e.g. the duration that data can be cached). On the other hand, a HEAD request results in the same metadata being returned, but without the actual body. Therefore, a HEAD request is a lightweight, simple way to check whether a resource exists at a URL, and/or if the resource has been updated. The deployment mechanism described herein may go beyond determining if the dependency merely exists, by receiving a response from it indicating that it is also operational. Alternatively, a microservice may be provided with a list of dependencies, such as during compilation, identifying the microservices on which the compiled microservice depends, and additional instances of a microservice may be instanced dynamically during runtime (as opposed to during initial installation).

Figure 5:
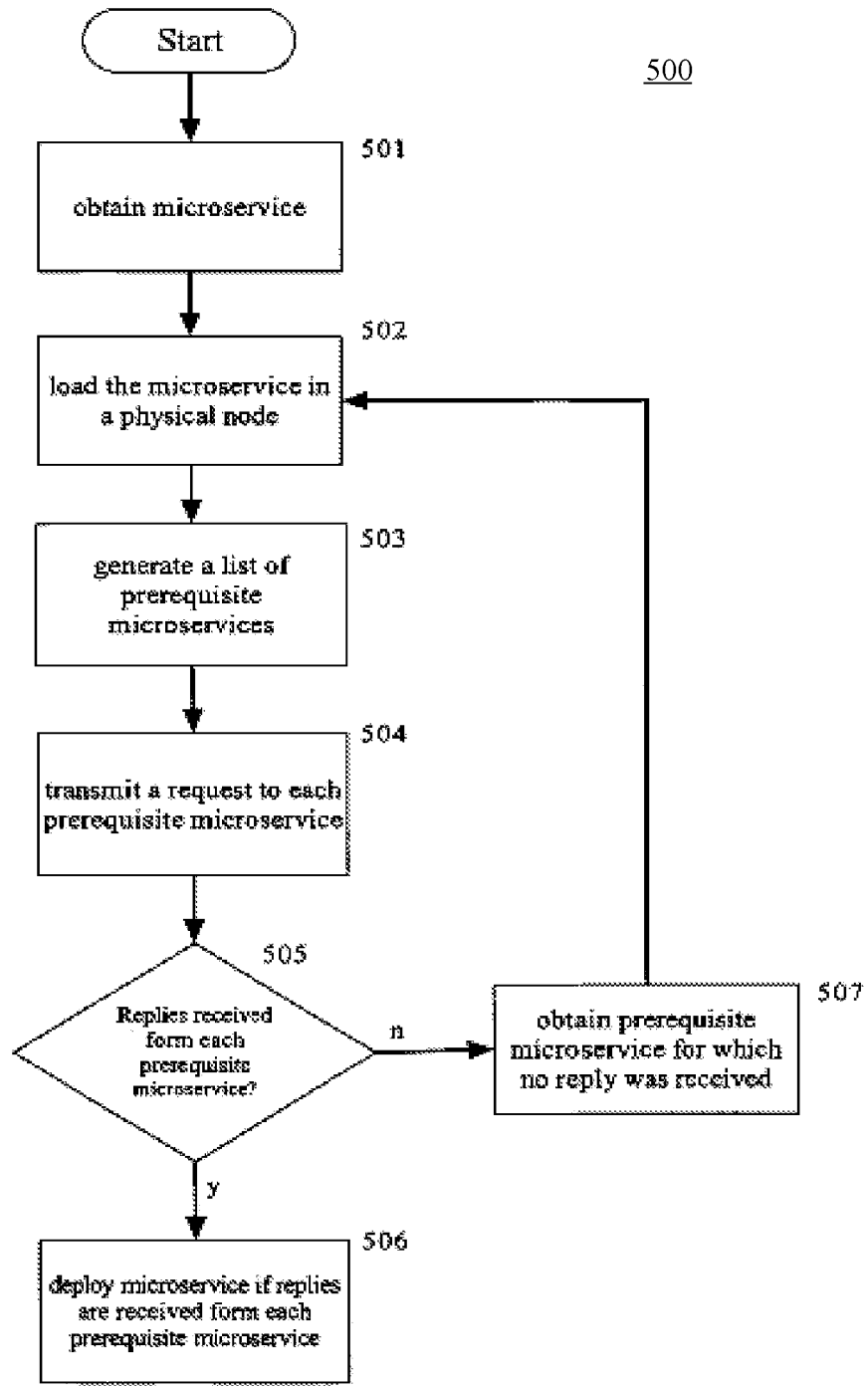
FIG. 5 is a flow chart of microservice deployment in the web service system of FIG. 1.

Referring to FIG. 5, one embodiment of a method 500 of deploying a web service in a network having addressable nodes is depicted. The method 500 comprises step 501 in which a microservice is obtained and loaded in a physical node in step 502. The microservice may comprise a framework having one or more utilities for communicating in a common protocol with the addressable nodes within a web service network, and a microservice-specific module linked to the framework. The microservice-specific module may have at least one routine for executing the function in response to a request. The microservice-specific module may require one or more prerequisite microservices to execute the function. In step 503, a list of prerequisite microservices from the microservice is generated. In step 504, a request is transmitted to each unique address of the prerequisite microservices to determine if the associated prerequisite microservice is operating, at least to the extent of acknowledging the request. As mentioned above, the request may be a request for a simple reply to minimize computational overhead and improve response time. For example, if the common protocol is HTTP, the simple reply may be a HEAD request. In step 505, a determination is made whether a reply is received from each associated prerequisite microservice. If so, the microservice is deployed in step 506.

If no reply is received for a particular prerequisite microservice as determined in step 505, the method may further include deploying the prerequisite microservice. In one embodiment, the method automatically deploys the particular prerequisite microservice by obtaining in step 507 the particular prerequisite microservice for which no reply was received, and reiterating steps 502-506 for the particular prerequisite microservice. Alternatively, or in conjunction with deploying the prerequisite microservice, if no reply is returned, the method may further comprise looking up a table of historical installations to determine if the prerequisite microservice was previously installed to determine if it is malfunctioning. If it is determined that the previously-installed, prerequisite microservice is malfunctioning, an alert may be sent to a network administrator to check the physical node that was supporting the prerequisite microservice.

The ability to "ping" (e.g., transmitting a message requesting a response) a prerequisite microservice relies on the prerequisite microservice having a unique address. To this end, the microservices should adhere to certain conventions. For example, as mentioned above, each microservice should have a unique URL prefix. Therefore, when a microservice is compiled, dependencies on other microservices can be established. For example, a dependency-tracking program such as Maven may be used to package a microservice for deployment in a certain environment and against a certain set of microservice dependencies. A microservice bundle may also contain run-time dependency annotations. This enables the deploy/undeploy function to be scripted. Specifically, the dependency annotations from a microservice bundle can be examined to determine the prerequisites for that microservice, and then verify their availability as described above. The deployment script may be a simple wrapper around Squid and Apache utility (mentioned above). The script may also modify the config files for URL load balancing or reverse proxy cache, start the microservice, and send a signal (e.g., SIGNUP in HTTP) to indicate that the load balancer and/or reverse proxy cache (e.g., Squid and/or Apache) should re-read its configuration. For example, if every microservice exposes a resource at the root path, then a HTTP "HEAD" request tells you if a microservice is installed on a physical node. The response may be, for example, a status code, for example 200 (ok) or 404 (not found) in HTTP parlance. This deployment mechanism therefore automatically tracks dependencies. This also allows for detecting deployed dependencies on sister or parent physical nodes.

It should be understood, that the deployment mechanism of the present invention can function using known and commercially available protocols. For example, the HEAD request is already supported by HTTP.

Having the microservice use a common framework linked to a microservice-specific module provides a number of benefits. First, since the microservice is specific to a particular function, it is transparent to the operating system of the physical node. In other words, each microservice is exposed as something the operating system can see and distinguish (namely, a process). The operating system therefore is able to multiplex the node's hardware resources across all the microservices efficiently. In a monolithic approach, where multiple functions are combined into one process, the operating system typically treats that whole process as a single entity from a resource management standpoint. This transparency enables the operating system to load balance and allocate resources to the microservice dynamically. This is a significant advantage over traditionally compiled programs in which the resource allocation was built in to the program before it is compiled. This transparency also eliminates the need for special-purpose monitoring hooks to be built into the application.

Additionally, a common framework can be written just once. Specifically, the core utilities/boilerplate can be implemented once in a framework so all that needs to be written is the microservice-specific module.

Furthermore, the common interface may isolate the microservice-specific module form the physical node and network at large. Therefore, the language of the microservice-specific module is not critical to the system and can be written in a language most suitable for executing the function of the microservice. In other words, each microservice can be written in any language supporting the underlying system protocol (e.g. HTTP) without having to coordinate implementation across microservices. For example, microservice A may be implemented in Java, while microservice B may be implemented in Python.

Because different microservice-specific modules may be written in different languages within a given node or among different nodes, the microservices architecture does not require the physical nodes to be homogeneous. This allows full flexibility for hardware purchasing decisions.

In addition, since the microservices are independently deployable, system operators have full flexibility with regard to the number of instances deployed for each microservice. Since processing resources can be devoted to the most costly services on a very granular basis, this allows for an overall cost savings in terms of efficient use of hardware resources. In particular, the features herein may allow precision in standing up more instances of a bottleneck microservice, instead of more instances of a large middleware program having superfluous functionality. For example, if an error is found in microservice B, the programmer would simply replace microservice B with microservice B'. Additionally if B was found to be running slow, a programmer would simply deploy additional copies B1, B2, etc. to the application.

Figure 6:
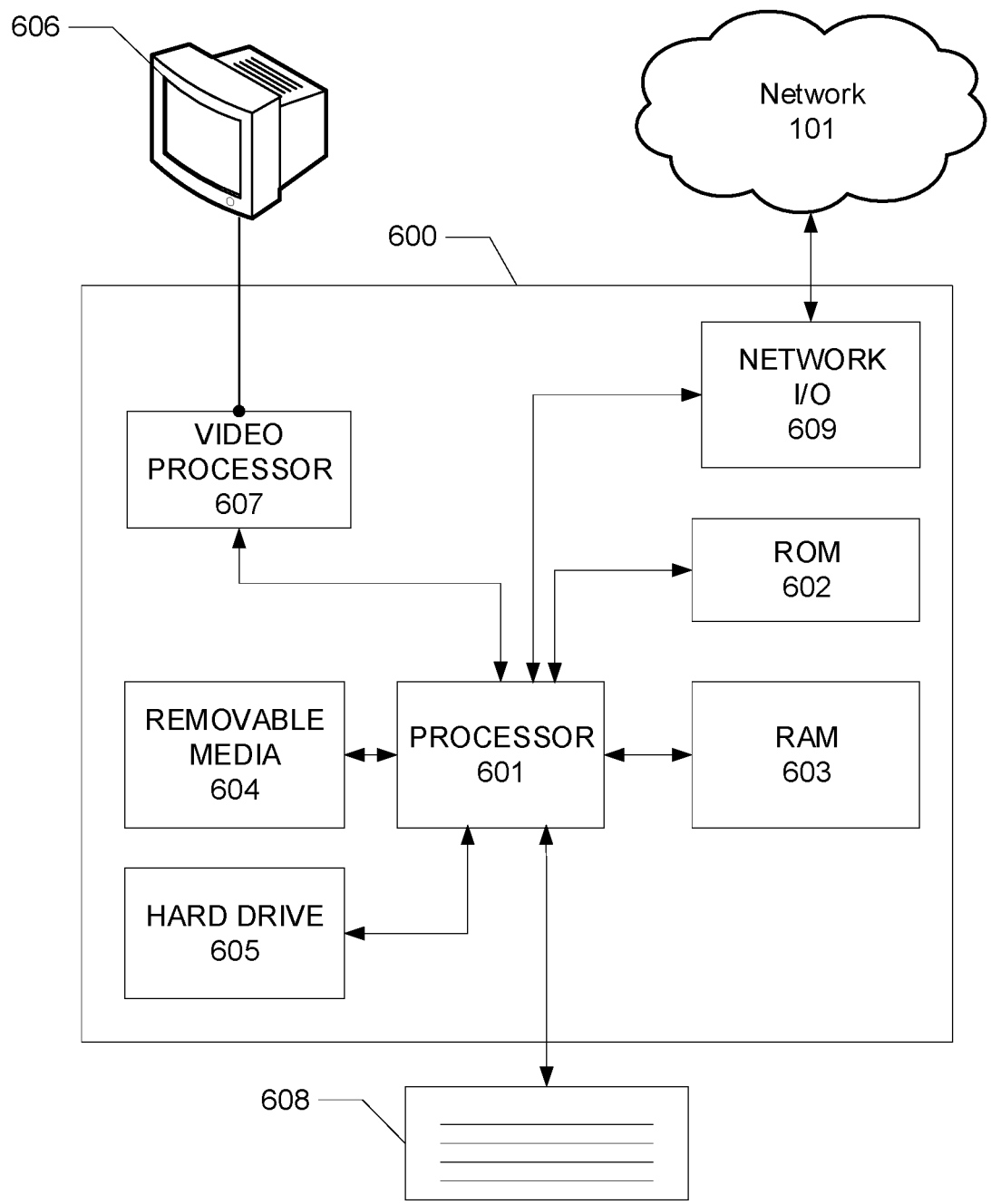
FIG. 6 illustrates an example computing hardware embodiment in which the various aspects described herein may be implemented.

The various components described herein may be implemented as software and/or hardware on a computing platform, such as a network server or computer. FIG. 6 illustrates the general hardware elements of such a server or computer 600. The server or computer 600 may include one or more processors 601, which may execute instructions of a computer program to perform any of the features described herein. Those instructions may be stored in any type of memory, to configure the operation of the processor 601. For example, instructions may be stored in a read-only memory (ROM) 602, random access memory (RAM) 603, removable media 604, such as a Universal Serial Bus (USB) drive, compact disk (CD) or digital versatile disk (DVD), floppy disk drive, or any other desired electronic storage medium. Instructions may also be stored in an attached hard drive 605. The server or computer 600 may include one or more output devices, such as a display 606, and may include one or more output device controllers 607, such as a video processor. There may also be one or more user input devices 608, such as a keyboard, mouse, touch screen, microphone, etc. The server or computer 600 may also include one or more network input/output circuits 609, such as a network card to communicate with network 101. The network interface may be a wired interface, wireless interface, or a combination of the two. In some embodiments, the interface 609 may include a cable modem, and network 101 may include a cable television system's coaxial, fiber, or hybrid fiber/coaxial distribution system. In some embodiments, the network caches may be implemented in memory space allocated to the network interface 609.

The examples described above are merely examples, and modifications may be made as desired. For example, various components and steps may be combined and/or subdivided depending on implementation.

The invention claimed is:

1. A method comprising:
distributing an application to a plurality of addressable nodes by deploying, for execution by the plurality of addressable nodes, a plurality of instances of an addressable discrete service, wherein the addressable discrete service is addressable using a network address different from addresses of the plurality of addressable nodes, and wherein execution of each of the plurality of instances provides a function of the application;
receiving, by a load balancer and from a computing device, a request that comprises the network address of the addressable discrete service; and
causing, by the load balancer, based on the request, and using the network address of the addressable discrete service, execution of an instance, of the plurality of instances, at a node of the plurality of addressable nodes.

2. The method of claim 1, wherein the causing execution of the instance comprises forwarding, to the node, the request, and the method further comprises:
receiving, from the node, a reply to the request; and
sending, to the computing device, the reply.

3. The method of claim 1, wherein the causing execution of the instance comprises forwarding, to the node, the request, and the method further comprises:
receiving, from the node, a reply to the request;
storing, in a cache, the reply;
receiving an additional request that comprises the network address of the addressable discrete service;
retrieving the reply from the cache; and
sending the reply as a response to the additional request.

4. The method of claim 1, wherein the network address of the addressable discrete service comprises a virtual Internet Protocol (IP) address.

5. The method of claim 1, wherein a reply, received from the node and based on the request, comprises an Extensible Markup Language (XML) document or a Hypertext Transfer Protocol (HTTP) header.

6. The method of claim 1, wherein the deploying the plurality of instances of the addressable discrete service comprises:
sending, by a deployment program and to each of the plurality of instances, one or more Hypertext Transfer Protocol (HTTP) HEAD requests; and
receiving, from each of the plurality of instances, one or more HTTP status codes as a response to the one or more HTTP HEAD requests.

7. The method of claim 1, further comprising:
determining a list of discrete services that are a prerequisite to the addressable discrete service;
deploying each discrete service on the list of discrete services; and
based on a determination that each discrete service on the list of discrete services has been deployed, proceeding to deploy the plurality of instances of the addressable discrete service.

8. The method of claim 1, wherein the execution of the instance comprises:
retrieving, from a database, one or more rows;
formatting the one or more rows as an XML document; and
generating a reply comprising the XML document.

9. The method of claim 1, wherein the execution of the instance comprises:
accessing a table in a database; and
processing a query for one or more rows from the table.

10. The method of claim 1, wherein the function of the application comprises searching content listings.

11. The method of claim 1, wherein the distributing the application to the plurality of addressable nodes further comprises causing a plurality of addressable discrete services to be deployed for execution by the plurality of addressable nodes; and
wherein the plurality of addressable discrete services comprises:
a first service that, when executed, determines advertisement content to display,
a second service that, when executed, processes a search through a content listing, and
a third service that, when executed, processes an order for a content item in the content listing.

12. The method of claim 1, further comprising:
receiving, by the load balancer, a second request that comprises the network address of the addressable discrete service; and
forwarding, by the load balancer and using an address of a second node of the plurality of addressable nodes, the second request to the second node, wherein the address of the second node is different from the network address.

13. The method of claim 1, wherein the node comprises a second load balancer, and
wherein the causing execution of the instance comprises forwarding the request to the instance by the second load balancer.

14. The method of claim 1, wherein the causing execution of the instance comprises:
forwarding the request to a port assigned to the instance,
wherein the node has been deployed with two or more instances of the plurality of instances,
wherein each of the two or more instances is assigned to its own port in the node, and
wherein each of the two or more instances is associated with the network address of the addressable discrete service.

15. The method of claim 1, wherein the node has been deployed with two or more instances of the plurality of instances, and
wherein the causing execution of the instance comprises forwarding, based on a determination that a first of the two or more instances is busy and that a second of the two or more instances is available, the request to the second of the two or more instances.

16. The method of claim 15, wherein the causing execution of the instance further comprises forwarding, based on a determination that the node previously processed an earlier request from the computing device, the request.

17. A method comprising:
distributing an application to a plurality of addressable nodes by deploying, for execution by the plurality of addressable nodes, a plurality of instances of an addressable discrete service, wherein the addressable discrete service is addressable using a network address different from addresses of the plurality of addressable nodes, and wherein execution of each of the plurality of instances provides a function of the application;
forwarding, to a node of the plurality of addressable nodes, a first Hypertext Transfer Protocol (HTTP) request that comprises the network address of the addressable discrete service and causes execution of an instance, of the plurality of instances, at the node;
storing, in a cache, a reply generated during the execution of the instance;
retrieving, based on receiving a second HTTP request and from the cache, the reply, wherein the second HTTP request comprises the network address of the addressable discrete service; and
sending, based on receiving the second HTTP request, the reply, wherein the second HTTP request comprises the network address of the addressable discrete service.

18. The method of claim 17, wherein the network address comprises a virtual Internet Protocol (IP) address, and
wherein the reply comprises an Extensible Markup Language (XML) document or an HTTP header.

19. The method of claim 17, wherein the distributing the application to the plurality of addressable nodes further comprises:

causing a plurality of addressable discrete services to be deployed for execution at the plurality of addressable nodes, wherein the plurality of addressable discrete services comprises:

a first service that, when executed, determines advertisement content to display, a second service that, when executed, processes a search through a content listing, and a third service that, when executed, processes an order for a content item in the content listing.

20. A method comprising:

distributing an application to a plurality of addressable nodes, wherein each of the plurality of addressable nodes executes one or more instances of an addressable discrete service, wherein the addressable discrete service is addressable using a network address different from addresses of the plurality of addressable nodes, and wherein execution of each of the one or more instances causes performance of a function of the application;

receiving a request for performance of the function;

causing, based on the request, at a node of the plurality of addressable nodes and by using the network address, execution of an instance of the addressable discrete service; and storing, in a cache, data generated during the execution of the instance.

21. The method of claim 20, wherein the network address comprises a virtual Internet Protocol (IP) address, and wherein the data comprises an Extensible Markup Language (XML) document or a Hypertext Transfer Protocol (HTTP) header.

22. The method of claim 20, wherein the function comprises a function for searching content listings.

23. The method of claim 20, wherein the distributing the application further comprises:

causing a plurality of addressable discrete services to be deployed for execution by the plurality of addressable nodes, wherein the plurality of addressable discrete services comprises:

a first service that, when executed, determines advertisement content to display, a second service that, when executed, processes a search through a content listing, and a third service that, when executed, processes an order for a content item in the content listing.

* * * * *